US012759361B2

(12) United States Patent
Steidl

(10) Patent No.: US 12,759,361 B2
(45) Date of Patent: Oct. 13, 2026

(54) SUSPENSION ARRANGEMENT AND METHOD FOR CONTROLLING A SUSPENSION ARRANGEMENT

(71) Applicant: Hasse & Wrede GmbH, Berlin (DE)

(72) Inventor: Michael Steidl, Berlin (DE)

( * ) Notice: Subject to any disclaimer, the term of this patent is extended or adjusted under 35 U.S.C. 154(b) by 255 days.

(21) Appl. No.: 18/710,345

(22) PCT Filed: Nov. 15, 2022

(86) PCT No.: PCT/EP2022/081961
§ 371 (c)(1),
(2) Date: May 15, 2024

(87) PCT Pub. No.: WO2023/088882
PCT Pub. Date: May 25, 2023

(65) Prior Publication Data

US 2026/0158844 A1 Jun. 11, 2026

(30) Foreign Application Priority Data

Nov. 16, 2021 (DE) ..................... 10 2021 129 863.6

(51) Int. Cl.
*B60G 17/015* (2006.01)
*B60G 17/08* (2006.01)

(52) U.S. Cl.
CPC ......... *B60G 17/0152* (2013.01); *B60G 17/08* (2013.01); *B60G 2202/413* (2013.01)

(58) Field of Classification Search
CPC ................ B60G 17/0152; B60G 17/08; B60G 2202/413
See application file for complete search history.

(56) References Cited

U.S. PATENT DOCUMENTS

| | | | | |
|---|---|---|---|---|
| 3,807,678 | A | 4/1974 | Karnopp et al. | |
| 10,054,203 | B2 | 8/2018 | Fida | |
| 2009/0139225 | A1* | 6/2009 | Wang | F15B 7/008 60/469 |

(Continued)

FOREIGN PATENT DOCUMENTS

| | | | | |
|---|---|---|---|---|
| CN | 105539046 B * | 9/2017 | | B60G 17/06 |
| CN | 111114228 A * | 5/2020 | | B60G 11/30 |
| DE | 34 42 622 C2 | 5/1989 | | |

(Continued)

OTHER PUBLICATIONS

CN111114228A Machine English Translation (Year: 2020).*

(Continued)

*Primary Examiner* — Jason D Shanske
*Assistant Examiner* — Matthew James O'Neill
(74) *Attorney, Agent, or Firm* — Crowell & Moring LLP

(57) ABSTRACT

A suspension arrangement for a vehicle, in particular a commercial vehicle, with a base and a body, includes at least one spring, at least one damper and at least one inerter. The at least one first spring, the at least one damper and the at least one inerter are each connected on the one hand to the body and on the other hand to the base. The at least one damper and the at least one inerter are each connected on the one hand to the body and on the other hand to the base. The at least one inerter has an adjustment device. A method for controlling the suspension arrangement is provided.

15 Claims, 8 Drawing Sheets

(56) References Cited

U.S. PATENT DOCUMENTS

| | | | | |
|---|---|---|---|---|
| 2010/0148463 A1* | 6/2010 | Wang | B60G 13/14 188/267 |

FOREIGN PATENT DOCUMENTS

| | | | |
|---|---|---|---|
| DE | 10 2009 002 260 | A1 | 10/2010 |
| DE | 10 2014 206 230 | A1 | 10/2015 |
| EP | 3 541 644 | B1 | 6/2021 |

OTHER PUBLICATIONS

CN-105539046-B Machine English Translation (Year: 2017).*
International Search Report (PCT/ISA/210) issued in PCT Application No. PCT/EP2022/081961 dated Feb. 6, 2023 with English translation (5 pages).
German-language Written Opinion (PCT/ISA/237) issued in PCT Application No. PCT/EP2022/081961 dated Feb. 6, 2023 with English translation (13 pages).
German-language Office Action issued in German Application No. 10 2021 129 863.6 dated Jun. 20, 2022 (4 pages).
Wang, F. et al., "Inerter Nonlinearities and the Impact on Suspension Control", American Control Conference, 2008, pp. 3245-3250 (7 pages).
Wagg, D., "A review of the mechanical inerter: historical context, physical realisations and nonlinear applications", Nonlinear Dyn, 2021, pp. 13-34, vol. 104 (22 pages).

* cited by examiner

State of the art

State of the art

SUSPENSION ARRANGEMENT AND METHOD FOR CONTROLLING A SUSPENSION ARRANGEMENT

BACKGROUND AND SUMMARY

The invention relates to a suspension arrangement. The invention also relates to methods for controlling such a suspension arrangement.

Suspension arrangements, e.g. for the suspension of a body or bodywork of a vehicle, in particular a commercial vehicle, are known in various embodiments.

For example, two or more springs with different stiffnesses are used in parallel to compensate for a load, e.g. of a commercial vehicle.

Air springs are connected to a compressed air supply and can change their stiffness by varying the pressure of the compressed air. This allows the natural frequency to remain within a small range, even if a load changes significantly (unloaded commercial vehicle as opposed to a fully loaded one).

FIG. 1 shows a schematic symbol representation of a suspension arrangement 1' according to the state of the art.

The suspension arrangement 1' is used to suspend a body 3 relative to a base 2. In the example shown, the body 3 is a body or body shell of a vehicle not shown, with the base 2 being a wheel suspension or an axle of the vehicle.

A coordinate z here runs perpendicular to the base 2, e.g. in a vertical axis of the associated vehicle. The coordinate z serves to illustrate the direction of movement of the body relative to the base.

The body 3 assumes different positions and thus different distances from the base 2 depending on how the body 3 is loaded.

The body 3 can also be adjusted to a raised position and a lowered position, e.g. for loading/unloading operations.

The suspension arrangement 1' includes at least one spring 4 and at least one damper 5.

The spring 4 is attached to the base 2 with a first spring end in a manner not shown in detail. A second spring end of the spring 4 is attached to the body 3.

In the same way, the damper 5 is attached to the base 2 and to the body 3 parallel to the spring 4.

The spring 4 is usually formed as an adjustable pneumatic spring in order to keep the natural frequency of the body 3 or the suspension arrangement 1' almost constant.

FIG. 2 shows a schematic perspective sectional view of a hydraulic inerter 6' according to the state of the art.

Inerters are relatively newly developed elements for the optimisation of mechanical networks. The inerter 6' simulates a large inertia with the help of a relatively small additional mass. The differential equation of an inerter corresponds to the electrotechnical analogue of a capacitor.

A hydraulic inerter 6' is described below as an example of an inerter. There are also other types of inerter, e.g. mechanical inerters.

A detailed description of the structure and function of inerters can be found in the following documents:

Inerter Nonlinearities and the Impact on Suspension Control, Fu-Cheng Wang et al, 2008 American Control Conference; and A review of the mechanical inerter: historical context, physical realisations and nonlinear applications, David J. Wagg, published online 24 Feb. 2021.

The hydraulic inerter 6' includes a hydraulic cylinder 7 with two chambers 8 and 9, a piston rod 10 with a piston 11 and a flywheel unit 12. The flywheel unit 12 is also referred to as a "flywheel".

The piston rod 10 is arranged so as to be displaceable in the longitudinal direction of the hydraulic cylinder 7. A longitudinal axis 10*a* of the piston rod 10 runs along the longitudinal axis of the hydraulic cylinder 7. The longitudinal axis 10*a* also runs in the direction of coordinate z.

The piston 11 is arranged on the piston rod 10 and is firmly connected to the piston rod 10. The piston 11 divides the interior of the hydraulic cylinder 7 into chambers 8 and 9. The chambers are filled with a fluid, e.g. a hydraulic fluid.

Each chamber 8, 9 comprises an inlet/outlet opening 8*a*, 9*a*. The inlet/outlet opening 8*a* of the first chamber 8 is connected to a first end of a first fluid line 13, which communicates with the first chamber 8. Similarly, the inlet/outlet opening 9*a* of the second chamber 9 is connected to a first end of a second fluid line 14, which communicates with the second chamber 9.

The two fluid lines 13, 14 are connected by their respective second ends to the flywheel unit 12, as will be explained in more detail below.

The flywheel unit 12 includes a drive housing 15 with a drive chamber 15*a*, a flywheel housing 17 with a chamber 17*a* and a flywheel 18.

The drive chamber 15*a* is provided with two inlet/outlet openings 15*b*, 15*c*. The first inlet/outlet opening 15*b* is connected to the second end of the first fluid line 13. On the second inlet/outlet opening 15*c* the second end of the second fluid line 14 is connected. In this way, the fluid lines 13, 14 communicate with the drive chamber 15*a* of the drive housing 15 of the flywheel unit 12.

An impeller 16 is arranged in the drive chamber 15*a* so that it can rotate about an axis of rotation 12*a* of the flywheel unit 12. In the example shown, the axis of rotation 12*a* runs at right angles to the longitudinal axis 10*a* of the piston rod 10 and thus of the hydraulic cylinder 7.

The underside of the drive chamber 15 is closed by a bottom. The top of the drive chamber 15 is closed by the flywheel housing 17. The flywheel 18 is mounted in the chamber 17*a* of the flywheel housing 17 so as to rotate about the axis of rotation 12*a*.

The flywheel 18 here is a circular cylindrical disc with a certain weight and moment of inertia, e.g. metallic.

The flywheel 18 is connected to the impeller 16 in a rotationally fixed manner via a connection (not shown), which runs through the top of the drive housing 15 and the bottom of the flywheel housing 17. The drive chamber 15*a* and the chamber 17*a* of the flywheel housing 17 can be sealed against each other or communicate with each other.

The inerter 6' is provided with inerter attachments 6*a*, 6*b*. These are only indicated by reference lines. A first inerter attachment 6*a* is located on the piston rod 10, for example, while the second inerter attachment 6*b* is attached to the hydraulic cylinder 7.

The mode of operation of the hydraulic inerter 6' is such that a relative acceleration between two connection points (e.g. the wheel or axle at the inerter mounting 6*a*, the other connection point of the inerter mounting 6*b* being the sprung body 3) is resisted.

The resistance is represented by the flywheel 18, which must be set in motion by displacing hydraulic fluid. This is done here by means of the impeller 16, which is arranged in series with the fluid lines 13, 14 between them. When the piston rod 10 with the piston 11 is displaced relative to the hydraulic cylinder 7 in the direction of the z-axis (to the left in FIG. 2), the piston 11 compresses the hydraulic fluid in the first chamber 8 of the hydraulic cylinder 7 and simultaneously generates a negative pressure in the second chamber 9 of the hydraulic cylinder 7. The hydraulic fluid flows from the first chamber 8 through the first fluid line 13 into the drive chamber 15*a* of the drive housing 15 of the flywheel unit 12 and out of the drive chamber 15*a* into the second fluid line 14. The hydraulic fluid flows on from the second fluid line 14 into the second chamber 9 of the hydraulic cylinder 7.

In the course of this, the impeller 16 in the drive chamber 15*a* of the flywheel unit 12 is rotated by the flow of hydraulic fluid. The impeller 16 transmits its rotation to the flywheel 18.

Because of the inertia of the flywheel 18 and the ratio between the hydraulic fluid to be displaced and the speed of the flywheel 18, a flow resistance is formed which opposes the flow of the hydraulic fluid of the inerter 6'.

The differential equation is F=b*(\ddot(x_1)−\ddot(x_2)). The resistance (the constant b of the differential equation) can be set by the inertia of the flywheel 18 and the ratio between the fluid to be displaced and the speed of the flywheel 18. In general, such a system has already been used successfully in Formula 1 vehicles, for example.

Document DE 34 42 622 C2 illustrates an example of an air spring device.

Document US 2009/0 139 225 A1 describes a hydraulic inerter mechanism.

The proposed solutions have generally proven themselves. However, there consists of a constant need for improved suspension arrangements.

The problem is therefore to provide an improved suspension arrangement.

A further problem is creating an improved method for controlling a suspension arrangement.

The problem is solved by the subject matter of the independent claims.

One aspect of the invention is to replace an air spring in a suspension arrangement with a conventional spring (whose stiffness cannot be adjusted) by installing a switchable inerter in parallel with the conventional spring.

A suspension arrangement according to the invention for a vehicle, in particular a commercial vehicle, with a base and a body, wherein the suspension arrangement includes at least one spring, at least one damper and at least one inerter, wherein the at least one first spring, the at least one damper and the at least one inerter are each connected on the one hand to the body and on the other hand to the base, wherein the at least one inerter comprises an adjustment device.

One advantage of the invention consists in the fact that no air spring adjustable with compressed air is required. This means that there is no need for a pressurised air supply.

Particularly in the case of electric vehicles and/or vehicles with electromechanical brakes, it is possible to dispense with a compressed air supply (compressor). This can save costs and the compressed air is also very inefficient in terms of energy consumption.

By means of the adjustment device, the inerter is a switchable or controllable inerter with which adaptation to different loading conditions is easily possible.

According to the invention, a method for controlling a suspension arrangement for a vehicle, in particular a commercial vehicle, having a base and a body, wherein the suspension arrangement includes at least one spring, at least one damper and at least one inerter, wherein the at least one spring, the at least one damper and the at least one inerter are each connected on the one hand to the body and on the other hand to the base, is provided. The method includes the process steps: VS1) Providing the suspension arrangement with at least one spring, at least one damper and at least one inerter with an adjustment device, wherein the inerter is in a first operating state with a first inertia adapted to an empty loading state of an associated vehicle; VS2) moving the inerter by means of the adjustment device into a second operating state with a second inertia which is adapted to a partially loaded state of the associated vehicle; and VS3) moving the inerter by means of the adjustment device into a third operating state with a third inertia which is adapted to a fully loaded state of the associated vehicle.

Advantageously, the suspension arrangement no longer requires a compressed air connection. The adjustment setting to the load conditions is effected through the switchable or controllable inerter. This allows an optimum operating state of the suspension arrangement to be achieved.

Advantageous developments of the invention are indicated by the subclaims.

In one embodiment, a first operating state of the inerter is set in a first position of the adjustment device, in which the inerter comprises a first inertia, wherein a second operating state of the inerter is set in a second position of the adjustment device, in which the inerter comprises a second inertia, which differs from the first inertia. This is advantageous as the inerter is switchable or adjustable in a simple manner.

In a further embodiment, the adjustment device comprises more than two positions, which correspond to more than two operating states of the inerter with different inertias. This enables an advantageous extension of the application range.

In a further embodiment, for a further advantageous extension of the range of application, it is also provided that the adjustment device comprises stepwise intermediate positions or a stepless adjustment between two positions.

In one embodiment, the at least one inerter is a hydraulic inerter with at least one flywheel unit. This design is favourably compact.

It is further provided that the adjustment device comprises at least one bypass with an actuator, wherein the at least one bypass bridges the at least one flywheel unit in one position of the actuator and is closed in another position of the actuator. Such an actuator can be, for example, an adjustable throttle or a solenoid valve. This is advantageous as these are commercially available components of high quality.

If the actuator of the at least one bypass comprises a closed state and an open state or has a stepwise or continuously variable transition from the closed state to the open state and back, this results in the advantage of adjustability with many positions.

Another embodiment provides that the inerter comprises at least one electric motor as an adjustment device, which is coupled directly or indirectly to a flywheel of the at least one flywheel unit. This results in the advantageous possibility of keeping the natural frequency of the structure almost constant by using a non-adjustable spring.

In yet another embodiment, the inerter comprises at least one flywheel unit with a flywheel with a variable moment of inertia, which forms the adjustment device. This design is favourably compact.

For this purpose, a suitable adjusting mechanism can adjust adjustable mass elements on and/or in the flywheel. Such an adjusting mechanism can be, for example, a lever gear with a motor or electromagnetic drive.

The at least one inerter is arranged parallel to the at least one spring and to the at least one damper. This results in the advantage of a compact and space-saving design.

A further embodiment provides that the at least one inerter comprises the function of the at least one damper in an integrated manner. This allows the at least one damper of the suspension arrangement to be advantageously dispensed with.

An additional embodiment involves combinations with other elements from mechanical networks that are suitable for increasing the isolation effect, e.g. tuned-mass absorbers or tuned-mass absorbers coupled via negative stiffnesses (known as the K-Damper concept).

In a further advantageous embodiment, the at least one spring is a non-adjustable spring. This means that a low-cost, high-quality component can be used.

A further embodiment of the method provides that the adjustment of the inerter from one operating state to another is carried out in steps or/and stepless by means of the adjustment device. This is advantageous as it enables finer adjustment.

It is advantageous if the inerter is adjusted by means of the adjustment device in the form of an electric motor coupled to a flywheel unit of the inerter. An electric motor is advantageously easy to control and is available in high quality at lower cost.

A further advantage arises in an embodiment which provides that the electric motor coupled to the flywheel unit of the inerter can also perform levelling of the suspension arrangement. This is particularly advantageous for height adjustment during loading/unloading on a ramp, as this levelling function can also be integrated.

In a still further embodiment of the method, it is further advantageous if the flywheel unit of the inerter is switched to a generator mode and can thus also be used simultaneously for damping the flywheel for recuperation of electrical energy, energy harvesting and/or optimum adjustment of the damping of the suspension arrangement.

In another embodiment of the method, it is also advantageous if the inerter is adjusted by changing a moment of inertia of the flywheel of the at least one flywheel unit by means of the adjustment device.

A particular advantage of the invention consists in the fact that by using the switchable or controllable inerter, an almost constant natural frequency of the body can be realised for the loaded and unloaded state of an associated vehicle.

Examples of embodiments of the invention are described below with reference to the accompanying drawings. These embodiments merely serve to illustrate the invention by means of preferred constructions, which, however, do not conclusively represent the invention. In this respect, other embodiments as well as modifications and equivalents of the illustrated embodiments can also be realised within the scope of the claims.

The terms “under”, “up”, “left”, “right”, “underside”, “top” refer to the arrangements in the figures.

DETAILED DESCRIPTION OF THE DRAWINGS

Figure 1:
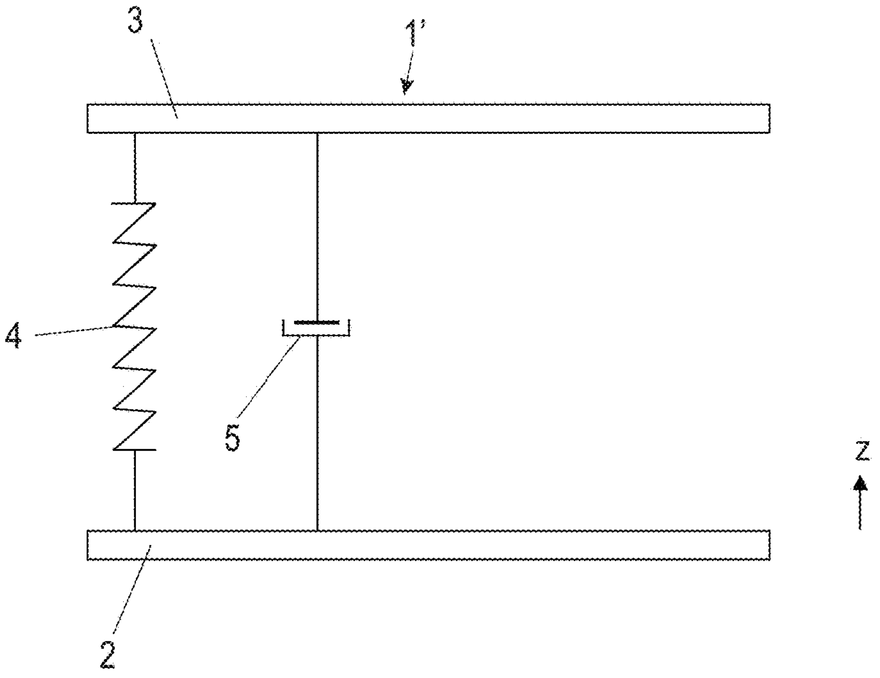
FIG. 1 is a schematic symbolic representation of a suspension arrangement according to the state of the art.
Figure 2:
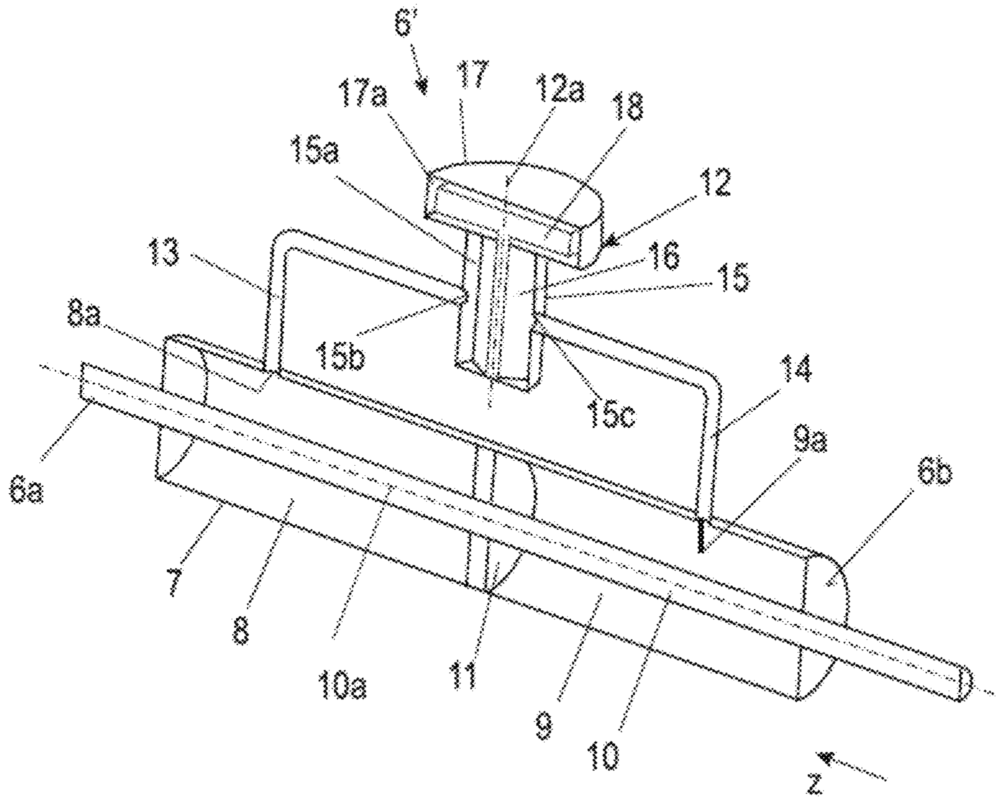
FIG. 2 is a schematic perspective sectional view of a hydraulic inerter according to the state of the art.

FIGS. 1 and 2 are already described above.

Figure 3:
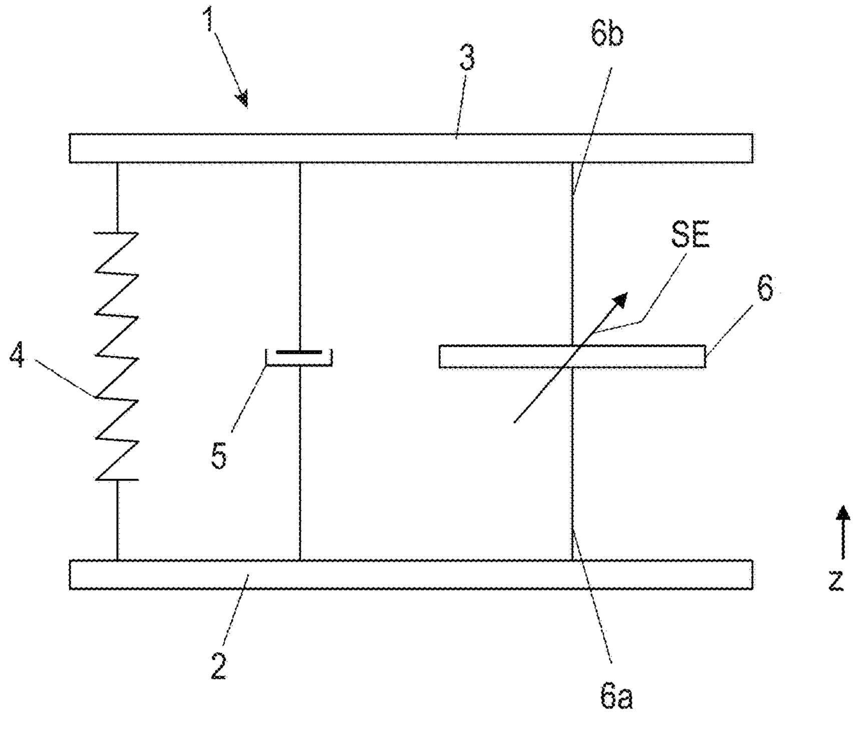
FIG. 3 is a schematic block diagram of a suspension arrangement according to an embodiment of the invention.

FIG. 3 shows a schematic block diagram of an embodiment of a suspension arrangement 1 according to the invention.

The suspension arrangement 1 includes the at least one spring 4, the at least one damper 5 and additionally an inerter 6 with an adjustment device SE.

In this example, the inerter 6 is a hydraulic inerter 6. The inerter 6 is arranged parallel to the at least one spring 4 and the at least one damper 5. The first inerter attachment 6*a* on the piston rod 10 is connected to the base, while the second inerter attachment 6*b* on the hydraulic cylinder 7 is connected to the body 3.

The hydraulic inerter 6 can be switched or adjusted from a functional position to a passive position by means of the adjustment device SE. In other words, the inerter 6 can be switched on or off for the spring 4 and the damper 5.

In addition, the inerter 6 can be adjusted in intermediate steps by means of the adjustment device SE, which can be realised in various ways. This is described in more detail below.

This switching option allows the natural frequency of the body with the suspension arrangement 1 to be kept almost constant by means of the adjustment device SE, whereby the spring 4 can be a non-adjustable spring.

In this way, the adjustable inerter 6 can be used to virtually increase the mass of the structure with the suspension arrangement 1 or to adjust the natural frequency.

All types of inerter can be used. In the examples shown, the hydraulic inerter 6 is used.

Figure 4:
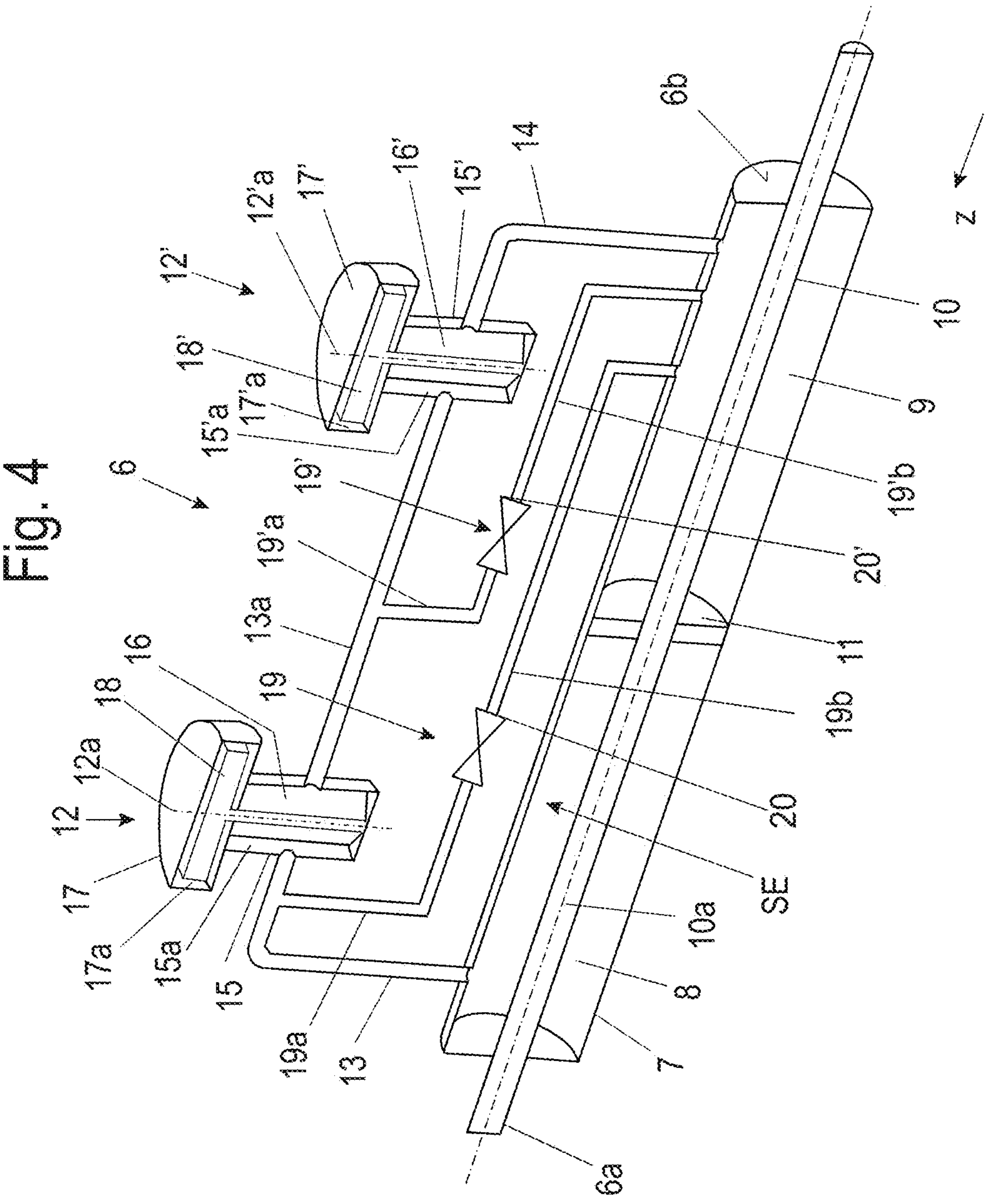
FIG. 4 a schematic perspective sectional view of a first embodiment of a hydraulic inerter according to the invention.

FIG. 4 shows a schematic perspective sectional view of a first embodiment of a hydraulic inerter 6 according to the invention.

The inerter 6 is a switchable or controllable inerter 6 and, in the example shown, comprises two flywheel units 12, 12' and an adjustment device SE.

The flywheel units 12, 12' are arranged in series and connected to each other via fluid lines 13*a*, 13*b*.

The first flywheel unit 12 is bypassed by a first bypass 19, and the second flywheel unit 12' is bypassed by a second bypass 19'.

The first bypass 19 is connected to the first fluid line 13 before the first flywheel unit 12 by a first bypass line 19*a*. The first bypass line 19*a* is connected to a second bypass line 19*b* via an actuator 20. The second bypass line 19*b* communicates with the second chamber 9 of the hydraulic cylinder 7.

The second bypass 19' is connected by a first bypass line 19'*a* to fluid lines 13*a* and 13*b* before the second flywheel unit 12'. The first bypass line 19'*a* is connected to a second bypass line 19'*b* via an actuator 20'. Like the second bypass line 19*b*, the second bypass line 19'*b* also communicates with the second chamber 9 of the hydraulic cylinder 7.

The first bypass 19 with the actuator 20 and the second bypass 19' with the actuator 20' form the adjustment device SE of the inerter 6.

In one embodiment, the actuators 20, 20' are simple valves, each with a closed and an open position. In another embodiment, the actuators 20, 20' may comprise several steps or be continuously variable. The actuators 20, 20' are electrically operated, for example as solenoid valves, motorised control valves or the like.

The actuators 20, 20' can also be formed as adjustable throttles.

The actuators 20, 20' or the adjustment devices SE, SE' can be operated by means of a control unit, which is not shown here, or/and manually.

The switchable inerter 6 can assume three operating states.

In the first operating state, the two flywheel units 12, 12' are bypassed by the open bypasses 19, 19' (open actuators 20, 20'). The flow of hydraulic fluid in the first fluid line 13 is channeled through the first bypass 19 into the second chamber 9 of the hydraulic cylinder 7 without the resistance of the first flywheel unit 12. In the first operating state, the inerter 6 comprises a first inertia.

The second operating state, in which the inerter 6 comprises a second inertia, is set by only the actuator 20' of the second bypass 19' being open. In this case, only the second flywheel unit 12' is bypassed. The first flywheel unit 12 then acts with its resistance on the flow of the hydraulic fluid.

And in the third operating state, the actuators 20, 20' of the two bypasses 19, 19' are closed, with both flywheel units 12, 12' acting by adding their two resistances one behind the other, i.e. connected in series or in a row. In this third operating state, the inerter 6 comprises a third inertia.

The first, second and third inertia differ from each other.

In a variant that is not shown, but is easily imaginable, only one flywheel unit 12, 12' with a bypass 19, 19' may be provided, for example. It is also possible that both flywheel units 12, 12' are provided with only one flywheel unit 12, 12' bypassed by a bypass 19, 19'.

Of course, another variant with more than two flywheel units 12, 12' with associated or fewer bypasses 19, 19' is also conceivable.

If the actuators 20, 20' comprise several stages or are continuously variable, a particularly varied adjustment of the inerter 6 is possible due to the variable flow resistances.

Thus, by switching off or partially switching on the inerter 6, a natural frequency of the body 3 or the suspension arrangement 1 can be set to match the loading conditions. For example, two inerters 6 can be switched on or off by bypass 19, 19' respectively It is therefore possible to adjust the damping by partially switching the bypasses (throttles) off and on or via the gap between the flywheel 18 and the flywheel housing 17 with the flywheel 18 inside the chamber 17$a$ of the flywheel housing 17.

A damper function can be generated in whole or in part by the inerter 6. This makes it possible to integrate the damper 5 into the inerter 6.

Figure 5:
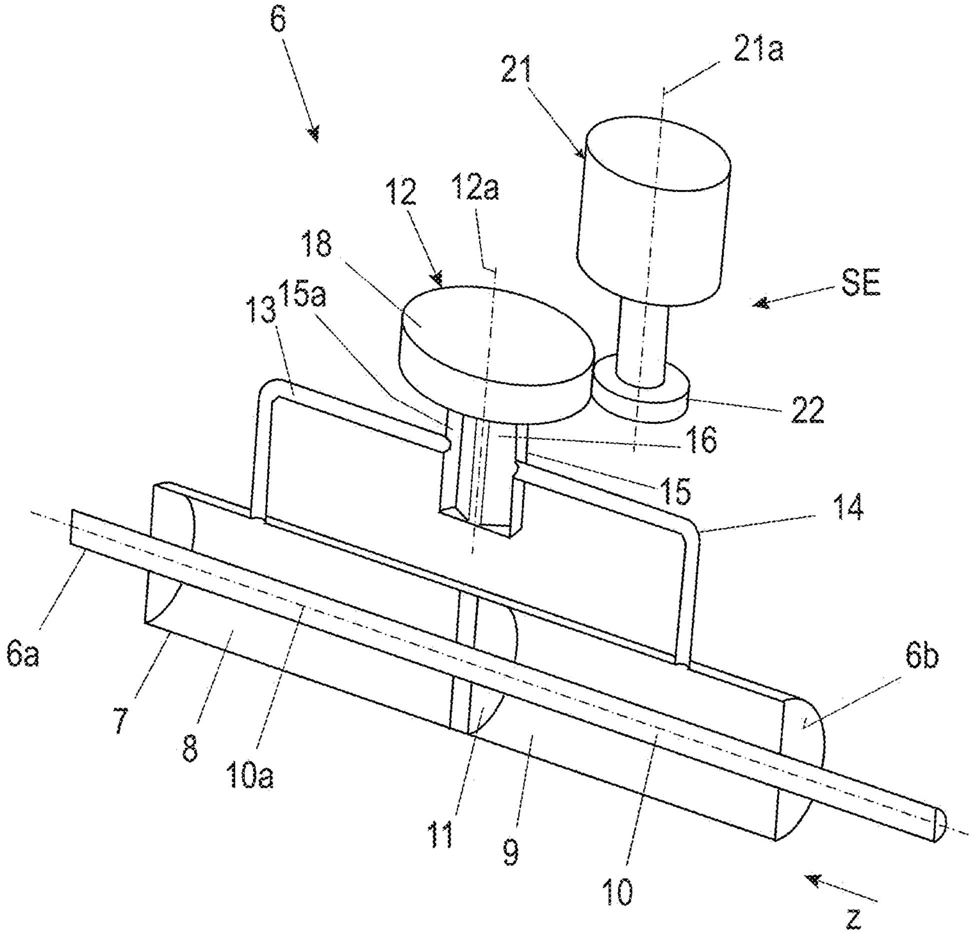
FIG. 5-6 are schematic perspective sectional views of variants of the inerter according to the invention.
Figure 6:
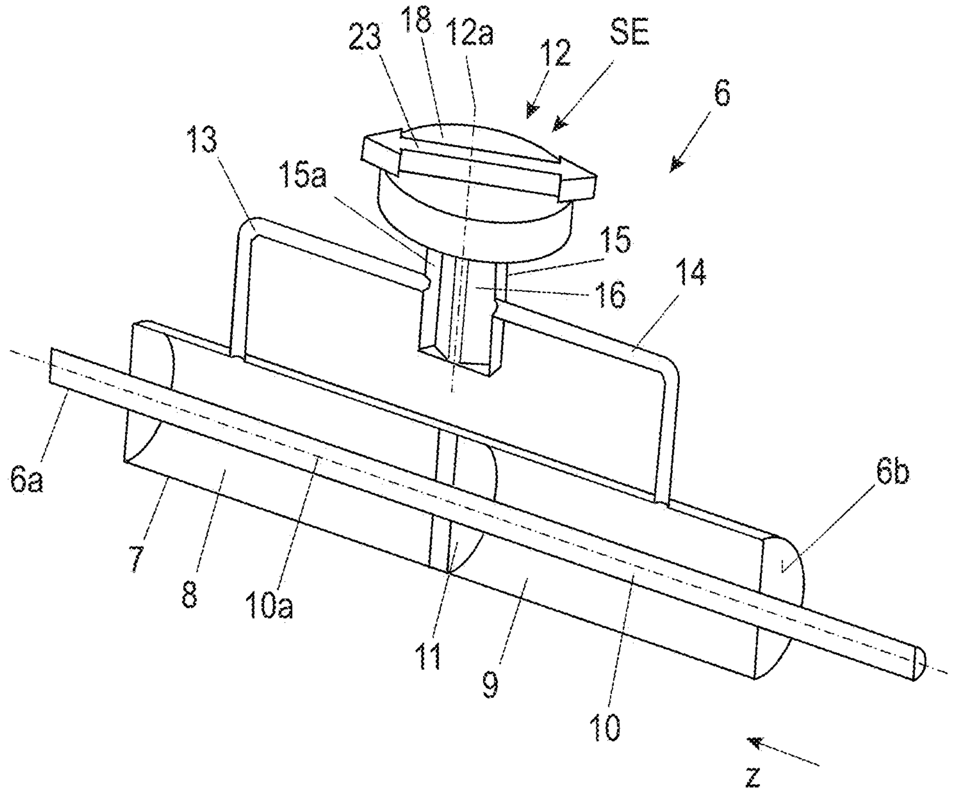

FIGS. 5 and 6 show schematic perspective sectional views of variants of the inerter 6 according to the invention.

In the variant of the inerter 6 in FIG. 5, the flywheel 18 of the flywheel unit 12 is positioned on the outside. This means that the inertia of the inerter 6 can be changed within certain limits by simply replacing the flywheel 18.

The inerter 6 can be used as an "active" inerter 6 by means of an electric motor 21. In this case, a motor pinion 22 engages on the side of the flywheel 18 via the electric motor 21. The motor pinion 22 engages with the flywheel 18 directly or indirectly, for example via a gearing. The motor pinion 22 and flywheel 18 have corresponding gearing. The electric motor 21 forms the adjustment device SE together with a control unit not shown.

Ideally, the gear is formed with a very high reduction ratio if the electric motor 21 has a high speed compared to the flywheel 18. On the other hand, the electric motor 21 together with its control unit can also be designed for low speeds.

The electric motor 21 can also use the flywheel connected to the flywheel 18 as a pump wheel for levelling, i.e. height adjustment of body 3 relative to base 2, and thus generate the levelling. This causes an adjustment between piston rod 10 and hydraulic cylinder 7 in the z-direction or in the opposite z-direction.

When a desired height is set, the electric motor 21 is switched off. The coupling of the electric motor 21 with the flywheel 18, e.g. a gear, is formed to be self-locking in order to prevent automatic resetting under load. However, this can also be prevented by means of a switchable valve in the fluid lines 13, 14.

For further adaptation of the inerter 6 to the installation situation between body 3 and base 2, suitable extensions and/or adjustment gears can be inserted between piston rod 10 and base 2 or hydraulic cylinder 7 and body 3.

A further function is possible if this electric motor 21 is switched to generator mode (by the control unit) and is thus also used simultaneously to dampen the flywheel 18 (recuperation of electrical energy, 'energy harvesting', optimum adjustment of the damping of the system).

Combination with integrated variants for levelling is possible, e.g. with gearing, lifting device, K-Damper.

FIG. 6 shows a variant of the inerter 6 in which the flywheel unit 12 comprises a flywheel 18 with a variable moment of inertia. A suitable adjusting mechanism 23 can be used for this purpose. This is indicated by the double arrow. The adjusting mechanism 23 may comprise, for example, radially adjustable mass elements. In this case, the flywheel 18 is arranged on the outside. However, it is also possible that the flywheel 18 with the adjusting mechanism 23 is arranged inside the flywheel housing 17, whereby the adjusting mechanism 23 can be adjusted from the outside, e.g. with a suitable lever gear.

Figure 7:
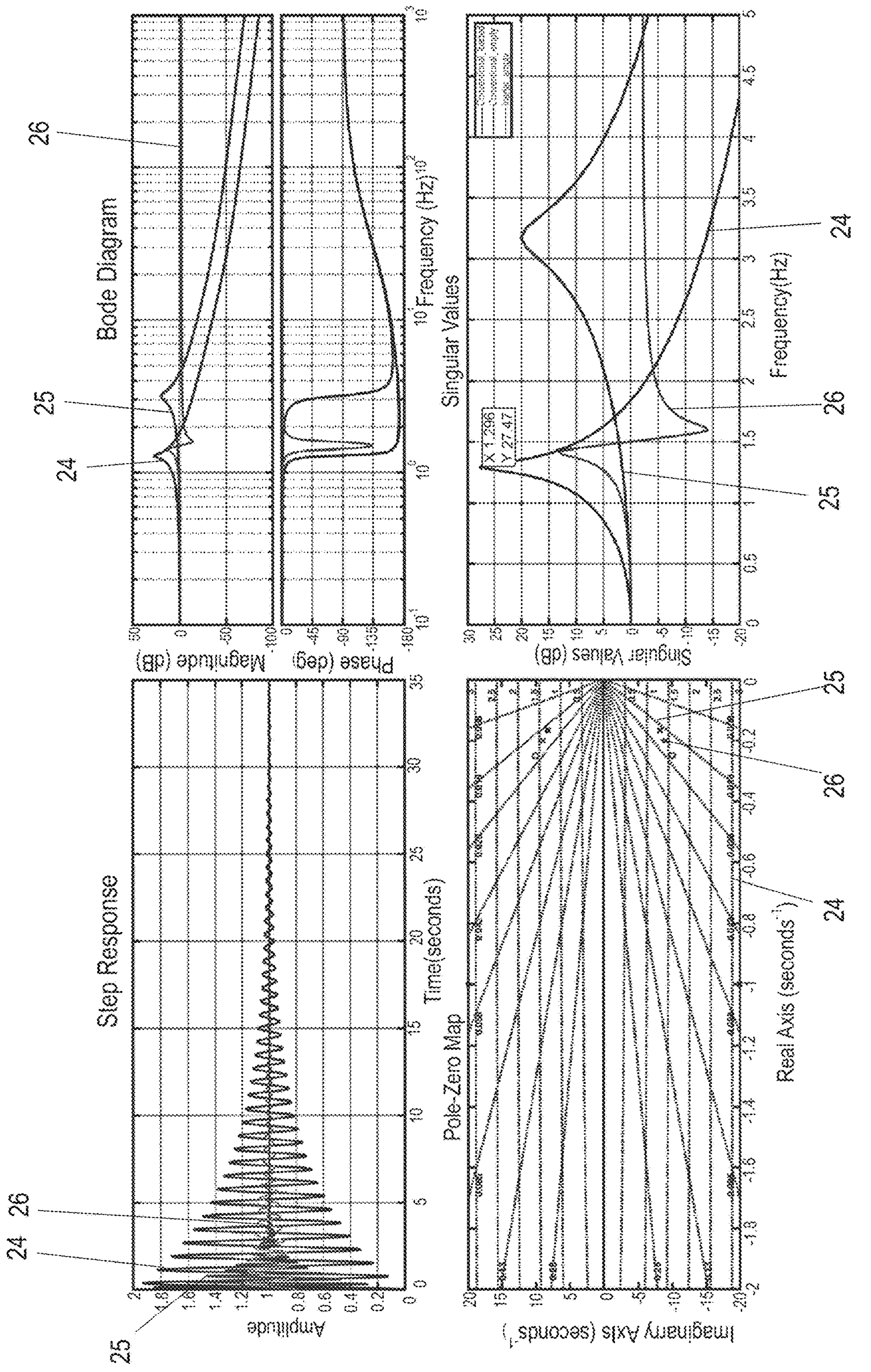
FIG. 7-8 are graphical representations of transfer functions and natural frequencies of the suspension arrangement according to the invention.

FIG. 7 shows graphical representations of transfer functions and natural frequencies of the suspension arrangement 1 according to the invention.

Figure 8:
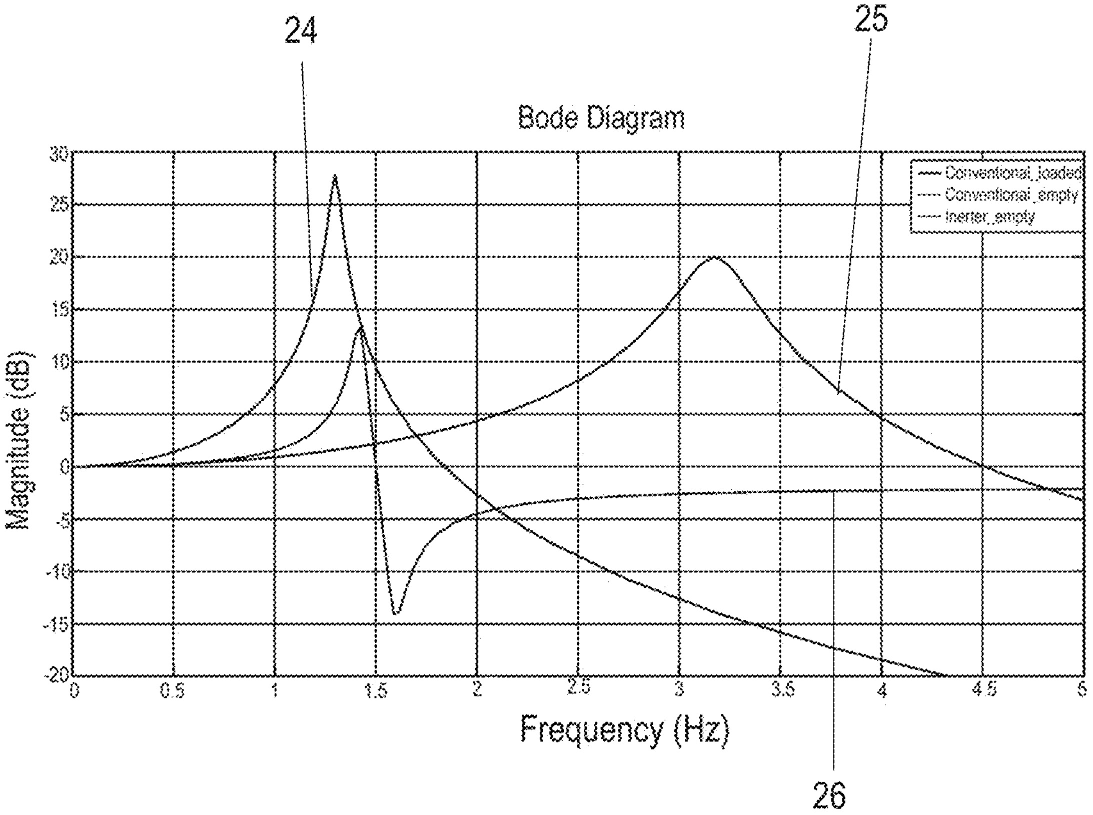

FIG. 8 shows an enlarged view of the natural frequencies.

Three graphs 24, 25, 26 are given as step response, Bode diagram, pole-zero diagram and natural frequency The graph 24 corresponds to a usual loading state of the body 3 or the suspension arrangement 1' (FIG. 1). Graph 25 shows an empty loading state, while graph 26 illustrates the empty loading state with a connected inerter 6.

It can be seen that the natural frequency for the conventional body 3 of a commercial vehicle is approx. 1.2 Hz when loaded and over 3 Hz when empty. By switching on the inerter 6, the natural frequency for the empty commercial vehicle can be brought back into the range of the loaded commercial vehicle. In general, natural frequencies in the range between 1 Hz and 2 Hz can be realised depending on the load condition and the switching option of the inerter 6, so that a natural frequency in the target range can also be realised with a constant spring rate.

The transfer function with inerter 6 is:

$$xT=(s\wedge 2b+s*d+c)/(s\wedge 2*(mT+b)+s*d+c)*u$$

Variable b can be used to set the natural frequency in dependence on the load (mass mT).

The transfer function without inerter 6 (b=0) is:

$$xT=(s*d+c)/(s^2*(mT)+s*d+c)*u$$

Combinations with other measures to influence the transfer function are also possible, such as K-Damper or TMA (Tuned Mass Absorber).

Figure 9:
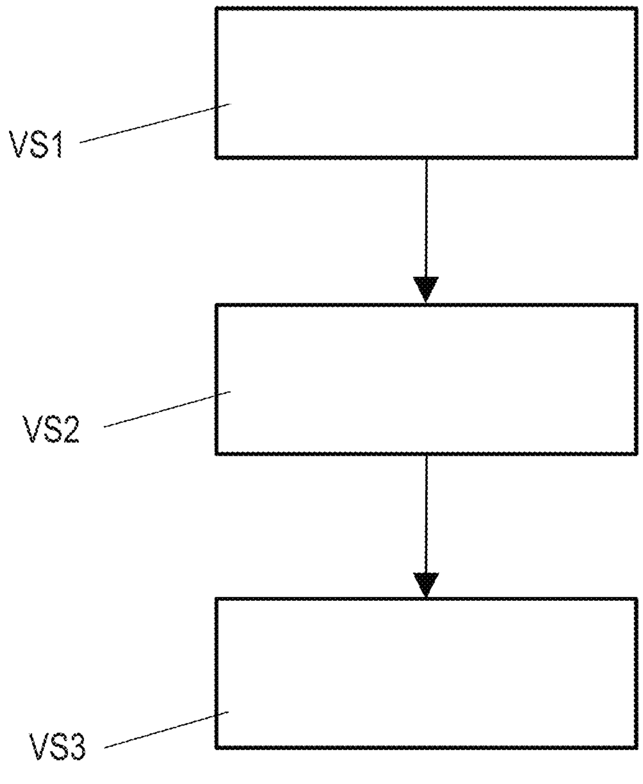
FIG. 9 is a schematic flow diagram of a method according to the invention.

FIG. 9 shows a schematic flow diagram of a method according to the invention for controlling the suspension arrangement 1 according to FIG. 3 in connection with FIGS. 4 to 6.

In a first process step VS1, the suspension arrangement 1 with a spring 4, a damper 5 and a switchable inerter 6 is provided by means of the adjustment device SE. The inerter 6 is in a first operating state with a first inertia, which is adapted to an empty charge state of an associated vehicle.

In a second process step VS2, the inerter 6 is adjusted to a second operating state with a second inertia, which is adapted to a partial loading of the associated vehicle, by means of the adjustment device SE.

In a third process step VS 3, the inerter 6 is adjusted with the adjustment device SE to a third operating state with a third inertia, which is adapted to a fully loaded state of the associated vehicle.

The adjustment from one operating state of the inerter 6 to another is carried out in steps or/and stepless.

In another operating state of the inerter 6, the suspension arrangement 1 is levelled by an electric motor 21 coupled to a flywheel unit 12 of the inerter 6.

The electric motor 21 is used as a generator in yet another operating state of the switchable inerter 6.

The adjustment or switching of the inerter 6 can also be carried out by changing a moment of inertia of the flywheel 18 of the flywheel unit 12, 12'.

The invention is not limited by the embodiments described above, but is modifiable within the scope of the claims.

LIST OF REFERENCE SIGNS

1, 1' Suspension arrangement
2 Base
3 Structure
4 Spring
5 Damper
6, 6' Inerter
6*a*, 6*b* Inner mounting
7 Hydraulic cylinder
8, 9 Chamber
8*a*, 9*a* Inlet/outlet opening
10 Piston rod
10*a* Longitudinal axis
11 Piston
12 Flywheel device
12*a* Axis of rotation
13, 13*a*; 14 Fluid line
15, 15' Drive housing
15*a*, 15'*a* Drive chamber
15*b*, 15'*b*, 15*c*, 15'*c* Inlet/outlet opening
16, 16' Impeller
17, 17' Flywheel housing
17*a*, 17'*a* Chamber
18, 18' Flywheel
19, 19' Bypass
19*a*, 19*b*; 19'*a*, 19'*b* Bypass line
20, 20' Actuator
21 Electric motor
21*a* Motor axle
22 Motor pinion
23 Adjusting mechanism
24, 25, 26 Graph
SE Adjustment device
VS1-3 Process step
z Coordinate

The invention claimed is:

1. A suspension arrangement for a vehicle having a base and a body, the suspension arrangement comprising:
at least one spring;
at least one damper; and
at least one inerter, wherein
the at least one spring, the at least one damper and the at least one inerter are each connected to the body and to the base,
the at least one inerter comprises an adjustment device,
the at least one inerter is a hydraulic inerter with at least one flywheel unit, and
the adjustment device comprises at least one bypass with an actuator, wherein the at least one bypass bridges the at least one flywheel unit in one position of the actuator and is closed in another position of the actuator.

2. The suspension arrangement according to claim 1, wherein
in a first position of the adjustment device, a first operating state of the at least one inerter is set, in which the at least one inerter comprises a first inertia, and
in a second position of the adjustment device, a second operating state of the at least one inerter is set, in which the at least one inerter comprises a second inertia that differs from the first inertia.

3. The suspension arrangement according to claim 1, wherein
the adjustment device comprises more than two positions which correspond to more than two operating states of the at least one inerter with different inertias.

4. The suspension arrangement according to claim 3, wherein
the adjustment device comprises stepwise intermediate positions or a stepless adjustment between two positions.

5. The suspension arrangement according to claim 1, wherein
the actuator of the at least one bypass comprises a closed state and an open state or comprises a stepwise or stepless transition from the closed state to the open state and back.

6. The suspension arrangement according to claim 1, wherein
the at least one inerter comprises at least one electric motor as the adjustment device, which is coupled directly or indirectly to a flywheel of the at least one flywheel unit.

7. The suspension arrangement according to claim 1, wherein
the at least inerter comprises the at least one flywheel unit with a flywheel with a variable moment of inertia, which forms the adjustment device.

8. The suspension arrangement according to claim 1, wherein
the at least one inerter is arranged parallel to the at least one spring and to the at least one damper.

9. The suspension arrangement according to claim 1, wherein the at least one inerter comprises the function of the at least one damper in an integrated manner.

10. The suspension arrangement according to claim 1, wherein the at least one spring is a non-adjustable spring.

11. A method for controlling a suspension arrangement for a vehicle having a base and a body, wherein the suspension arrangement includes at least one spring, at least one damper and at least one inerter, and wherein the at least one spring, the at least one damper and the at least one inerter are each connected to the body and to the base, the method comprising the steps of:

VS1) providing the suspension arrangement with the at least one spring, the at least one damper and the at least one inerter, wherein the at least one inerter has an adjustment device, and wherein the at least one inerter is in a first operating state with a first inertia which is adapted to an empty loading state of an associated vehicle;

VS2) adjusting the at least one inerter by way of the adjustment device into a second operating state with a second inertia adapted to a partial load of the associated vehicle; and VS3) adjusting the at least one inerter by way of the adjustment device into a third operating state with a third inertia adapted to a fully loaded state of the associated vehicle, wherein the adjustment of the at least one inerter is carried out by the adjustment device in the form of an electric motor which is coupled to a flywheel unit of the at least one inerter.

12. The method according to claim 11, wherein the adjustment of the at least one inerter by way of the adjustment device from one operating state to another is carried out in steps or/and stepless.

13. A method for controlling a suspension arrangement for a vehicle having a base and a body, wherein the suspension arrangement includes at least one spring, at least one damper and at least one inerter, and wherein the at least one spring, the at least one damper and the at least one inerter are each connected to the body and to the base, the method comprising the steps of:

VS1) providing the suspension arrangement with the at least one spring, the at least one damper and the at least one inerter, wherein the at least one inerter has an adjustment device, and wherein the at least one inerter is in a first operating state with a first inertia which is adapted to an empty loading state of an associated vehicle;

VS2) adjusting the at least one inerter by way of the adjustment device into a second operating state with a second inertia adapted to a partial load of the associated vehicle; and VS3) adjusting the at least one inerter by way of the adjustment device into a third operating state with a third inertia adapted to a fully loaded state of the associated vehicle, wherein the adjustment of the at least one inerter is carried out by the adjustment device in the form of an electric motor which is coupled to a flywheel unit of the at least one inerter, wherein the electric motor coupled to the flywheel unit of the at least one inerter performs a levelling of the suspension arrangement.

14. A method for controlling a suspension arrangement for a vehicle having a base and a body, wherein the suspension arrangement includes at least one spring, at least one damper and at least one inerter, and wherein the at least one spring, the at least one damper and the at least one inerter are each connected to the body and to the base, the method comprising the steps of:

VS1) providing the suspension arrangement with the at least one spring, the at least one damper and the at least one inerter, wherein the at least one inerter has an adjustment device, and wherein the at least one inerter is in a first operating state with a first inertia which is adapted to an empty loading state of an associated vehicle;

VS2) adjusting the at least one inerter by way of the adjustment device into a second operating state with a second inertia adapted to a partial load of the associated vehicle; and VS3) adjusting the at least one inerter by way of the adjustment device into a third operating state with a third inertia adapted to a fully loaded state of the associated vehicle, wherein the adjustment of the at least one inerter is carried out by the adjustment device in the form of an electric motor which is coupled to a flywheel unit of the at least one inerter, wherein the flywheel unit of the at least one inerter is switched into a generator mode and is thus also used simultaneously for damping the flywheel for recuperation of electrical energy, energy harvesting and/or adjustment of the damping of the suspension arrangement.

15. A method for controlling a suspension arrangement for a vehicle having a base and a body, wherein the suspension arrangement includes at least one spring, at least one damper and at least one inerter, and wherein the at least one spring, the at least one damper and the at least one inerter are each connected to the body and to the base, the method comprising the steps of:

VS1) providing the suspension arrangement with the at least one spring, the at least one damper and the at least one inerter, wherein the at least one inerter has an adjustment device, and wherein the at least one inerter is in a first operating state with a first inertia which is adapted to an empty loading state of an associated vehicle;

VS2) adjusting the at least one inerter by way of the adjustment device into a second operating state with a second inertia adapted to a partial load of the associated vehicle; and VS3) adjusting the at least one inerter by way of the adjustment device into a third operating state with a third inertia adapted to a fully loaded state of the associated vehicle, wherein the adjustment of the at least one inerter is carried out by the adjustment device in the form of an electric motor which is coupled to a flywheel unit of the at least one inerter, wherein the adjustment of the inertia is carried out by changing a moment of inertia of the flywheel of the at least one flywheel unit by use of the adjustment device.

* * * * *